United States Patent
Bushey et al.

(10) Patent No.: US 8,117,030 B2
(45) Date of Patent: Feb. 14, 2012

(54) SYSTEM AND METHOD FOR ANALYSIS AND ADJUSTMENT OF SPEECH-ENABLED SYSTEMS

(75) Inventors: Robert R. Bushey, Cedar Park, TX (US); Benjamin A. Knott, Austin, TX (US); John M. Martin, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 535 days.

(21) Appl. No.: 11/531,509

(22) Filed: Sep. 13, 2006

(65) Prior Publication Data

US 2007/0027694 A1    Feb. 1, 2007

Related U.S. Application Data

(63) Continuation of application No. 10/939,744, filed on Sep. 13, 2004, now Pat. No. 7,110,949.

(51) Int. Cl.
*G10L 15/06* (2006.01)
*G10L 11/00* (2006.01)
*G10L 21/00* (2006.01)

(52) U.S. Cl. ..... 704/243; 704/244; 704/270; 704/270.1; 704/275

(58) Field of Classification Search ............... 704/243, 704/244, 270, 270.1, 275
See application file for complete search history.

(56) References Cited

U.S. PATENT DOCUMENTS

| | | | |
|---|---|---|---|
| 4,712,242 A * | 12/1987 | Rajasekaran et al. | 704/253 |
| 5,581,600 A | 12/1996 | Watts et al. | 379/67 |
| 5,633,909 A | 5/1997 | Fitch | 379/15 |
| 5,642,518 A | 6/1997 | Kiyama et al. | 395/757 |
| 5,867,817 A | 2/1999 | Catallo et al. | 704/255 |
| 5,912,949 A * | 6/1999 | Chan et al. | 379/88.03 |
| 5,924,105 A | 7/1999 | Punch, III et al. | 707/513 |
| 6,026,388 A * | 2/2000 | Liddy et al. | 707/1 |
| 6,081,774 A * | 6/2000 | de Hita et al. | 704/9 |
| 6,178,404 B1 * | 1/2001 | Hambleton et al. | 704/275 |
| 6,202,043 B1 | 3/2001 | Devoino et al. | 703/17 |
| 6,212,517 B1 | 4/2001 | Sato et al. | 707/5 |
| 6,311,157 B1 | 10/2001 | Strong | 704/255 |
| 6,314,402 B1 | 11/2001 | Monaco et al. | 704/275 |
| 6,335,964 B1 | 1/2002 | Bowater et al. | 379/88.16 |
| 6,405,170 B1 | 6/2002 | Phillips et al. | 704/270 |

(Continued)

OTHER PUBLICATIONS

Robert R. Bushey et al., U.S. Patent Application, entitled "System, Method and Software for a Speech-Enabled Call Routing Application Using an Action-Object Matrix," filed Dec. 15, 2003, U.S. Appl. No. 10/736,296, 27 pages, 5 pages of drawings.

(Continued)

*Primary Examiner* — Eric Yen
(74) *Attorney, Agent, or Firm* — Jackson Walker L.L.P.

(57) ABSTRACT

A method for analyzing and adjusting the performance of a speech-enabled application includes selecting a number of user utterances that were previously received by the speech-enabled application. The speech-enabled application receives such user utterances and associates each user utterance with an action-object based on one or more salient terms in the user utterance that are associated with the action-object. The method further includes associating one of a number of action-objects with each of the selected user utterances. Furthermore, for each action-object, the percentage of the utterances associated with the action-object that include at least one of the salient terms associated with the action-object is determined. If the percentage does not exceed a selected threshold, the method also includes adjusting the one or more salient terms associated with the action-object.

17 Claims, 4 Drawing Sheets

U.S. PATENT DOCUMENTS

| | | | |
|---|---|---|---|
| 6,434,521 B1 | 8/2002 | Barnard | 704/244 |
| 6,466,654 B1 * | 10/2002 | Cooper et al. | 379/88.01 |
| 6,516,051 B2 | 2/2003 | Sanders | 379/10.03 |
| 6,598,022 B2 | 7/2003 | Yuschik | 704/275 |
| 6,757,362 B1 * | 6/2004 | Cooper et al. | 379/88.01 |
| 6,937,986 B2 * | 8/2005 | Denenberg et al. | 704/275 |
| 7,103,542 B2 * | 9/2006 | Doyle | 704/231 |
| 7,228,276 B2 * | 6/2007 | Omote et al. | 704/243 |
| 7,272,560 B2 * | 9/2007 | Abrego et al. | 704/244 |
| 2002/0072914 A1 | 6/2002 | Alshawi | 704/270.1 |
| 2002/0169606 A1 | 11/2002 | Bantz et al. | 704/235 |
| 2002/0196911 A1 * | 12/2002 | Gao et al. | 379/88.03 |
| 2003/0091163 A1 | 5/2003 | Attwater et al. | 379/88.01 |
| 2003/0195739 A1 | 10/2003 | Washio | 704/1 |
| 2003/0212561 A1 | 11/2003 | Williams et al. | 704/270 |
| 2004/0083092 A1 | 4/2004 | Valles | 704/9 |

OTHER PUBLICATIONS

Robert R. Bushey et al., U.S. Patent Application, entitled "Method for Designing an Automated Speech Recognition (ASR) Interface for a Customer Call Center," filed May 24, 2004, U.S. Appl. No. 10/852,342, 25 pages, 4 pages of drawings.

Theodore B. Pasquale et al., U.S. Patent Application, entitled "System, Method and Software for Transitioning Between Speech-Enabled Applications using Action-Object Matrices," filed May 12, 2004, U.S. Appl. No. 10/843,924, 40 pages, 7 pages of drawings.

* cited by examiner

FIG. 3

| OBJECTS | ACQUIRE | CANCEL | CHANGE | INQUIRE | INFORM | HOW TO USE | SCHEDULE | FIX REPAIR | WHERE | RECONNECT | MOVE | PAY |
|---|---|---|---|---|---|---|---|---|---|---|---|---|
| OPTIONAL SERVICES: CALLNOTES CALLFORWARDING CALLERID PACKAGES DSL LONGDISTANCE ETC. | • 214 | • | • | • | | | | | | | | |
| BASIC SERVICE | • | • | | • | | • 212 | | • | | | | |
| CPE | • | • | | | | • | | • | | | | |
| ACCOUNT | | | • | • | | | | | | | | |
| BILL | | • | • 206 | • | • | | | • 208 | | | | |
| ACQUISITION | | • | • | • | • | | • | | | | | |
| CANCELATION | | • | • | • | • | | • | | | | | |
| FIX-REPAIR | | • | • | • | • | | • | | | | | |
| MOVE | | • | • | • | • | | • | | | • | • | |
| PAYMENT | | | • | • | | • | • | | | | | • |
| OTHER PROVIDERS | | | | • | | | | | • | • 210 | | |
| COUPONS SPECIALS | | | | • | | | | | | | | |
| NAME/ NUMBER | | | | • | | | | | | | | |
| STORE LOCATIONS | | | | | | | | | | | | |

204 OBJECTS ← | 202 ACTIONS | 120

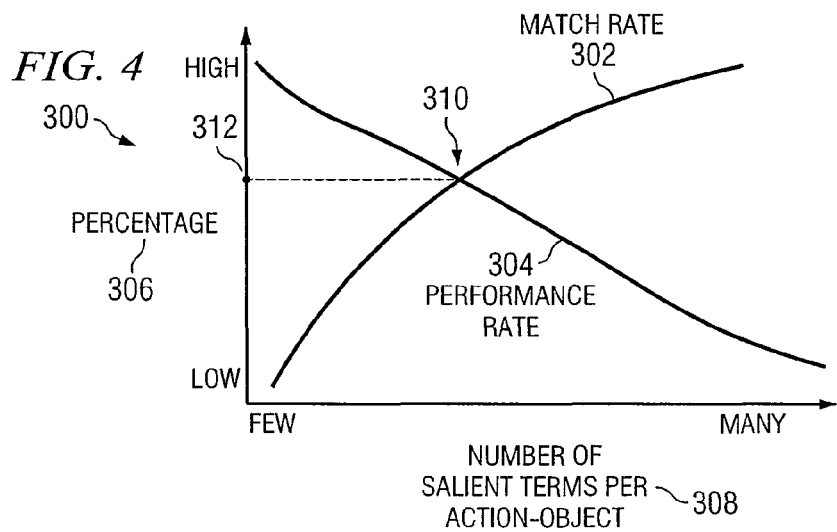
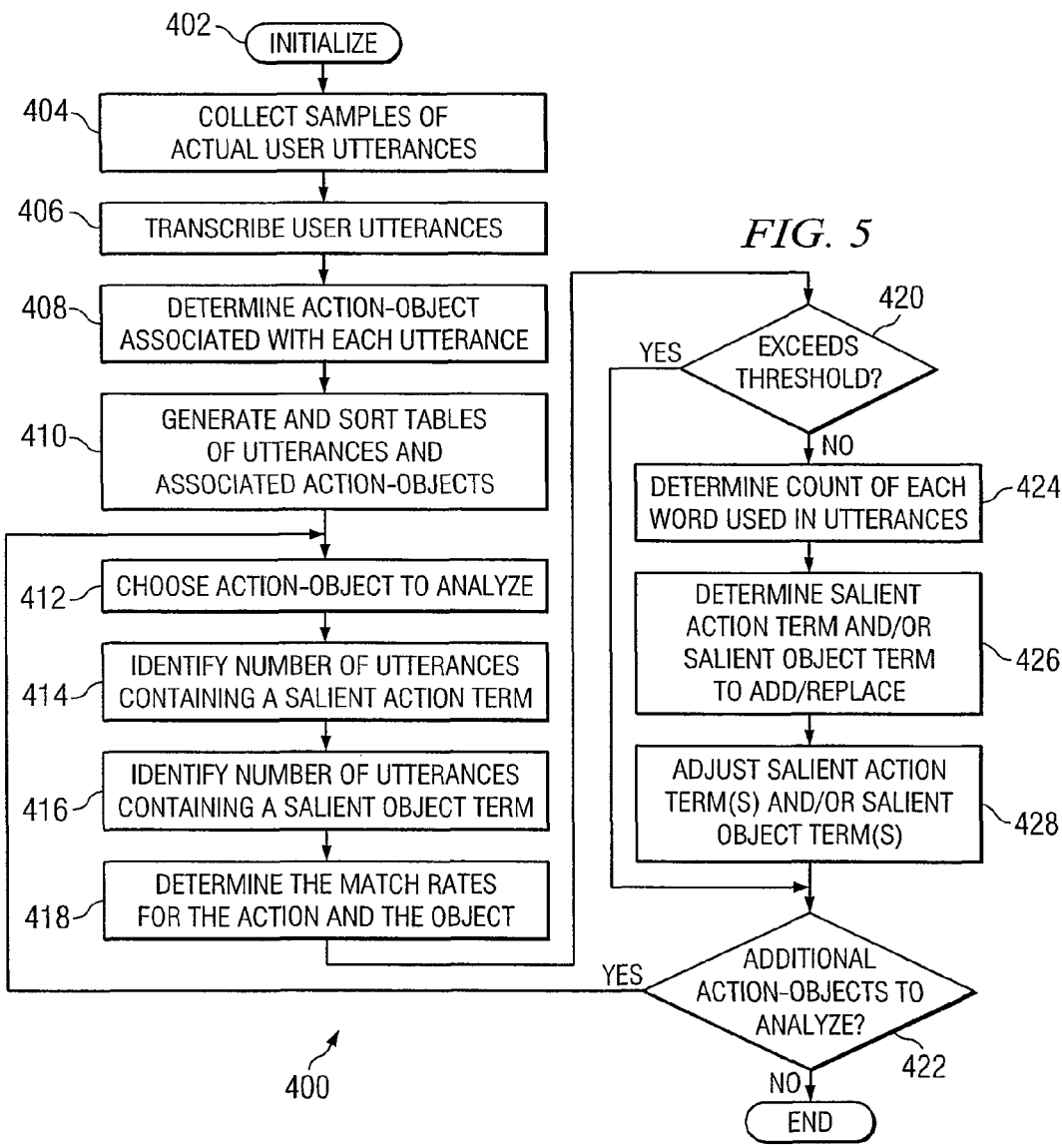

SYSTEM AND METHOD FOR ANALYSIS AND ADJUSTMENT OF SPEECH-ENABLED SYSTEMS

RELATED APPLICATION

This application is a continuation of U.S. patent application Ser. No. 10/939,744 filed Sep. 13, 2004 now U.S. Pat. No. 7,110,949, hereby incorporated in its entirety by reference.

TECHNICAL FIELD OF THE INVENTION

The present invention relates generally to speech-enabled systems and, more particularly, to a system and method for analysis and adjustment of speech-enabled systems.

BACKGROUND OF THE INVENTION

Developments in speech recognition technologies support more natural language interaction between services, systems and customers than previously supported. One of the most promising applications of speech recognition technology, Automatic Call Routing (ACR), seeks to determine why a customer has called a service center and to route the customer to an appropriate service agent for customer request servicing. Speech recognition technology generally allows an ACR application to recognize natural language statements from the customer, thus minimizing reliance on conventional menu systems. This permits a customer to state the purpose of their call "in their own words".

In order for an ACR application to properly route calls, the ACR generally must interpret the intent of the customer, identify the type or category of customer call, and identify the correct routing destination for the call type. An ACR application may attempt to match one or words in a statement by a customer to a particular pre-defined action to be taken by the ACR application. The techniques used to defined such actions and to associate particular words spoken by the customer with such actions affect the performance of the ACR application.

SUMMARY OF THE INVENTION

In accordance with a particular embodiment of the present invention, a method for analyzing and adjusting the performance of a speech-enabled application includes selecting a number of user utterances that were previously received by the speech-enabled application.

The speech-enabled application receives such user utterances and associates each user utterance with an action-object based on one or more salient terms in the user utterance that are associated with the action-object. The method further includes associating one of a number of action-objects with each of the selected user utterances. Furthermore, for each action-object, the percentage of the utterances associated with the action-object that include at least one of the salient terms associated with the action-object is determined. If the percentage does not exceed a selected threshold, the method also includes adjusting the one or more salient terms associated with the action-object.

Technical advantages of particular embodiments of the present invention include a method and system for analysis and adjustment of speech-enabled systems that improves the operation of such systems. For example, particular embodiments may evaluate the words used by a speech-enabled system (such as a service center with an ACR) to match a statement received from a user of the system with an appropriate action to take on behalf of the user. Furthermore, based on the determined effectiveness of the evaluated words, certain embodiments can adjust these words used by the speech-enabled system to enhance performance of the application and to better achieve the result desired by the user.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 is a diagram depicting an example embodiment of an automatic call router action-object matrix according to one embodiment of the present invention;

FIG. 4 is a graph showing an example relationship between a match rate for matching user utterances with salient terms and a performance rate for correctly directing a user to the appropriate destination of a service center; and FIG. 5 is a flow diagram depicting an example method for analyzing and adjusting the performance of a speech-enabled application according to one embodiment of the present invention.

DETAILED DESCRIPTION OF THE DRAWINGS

Figure 1:
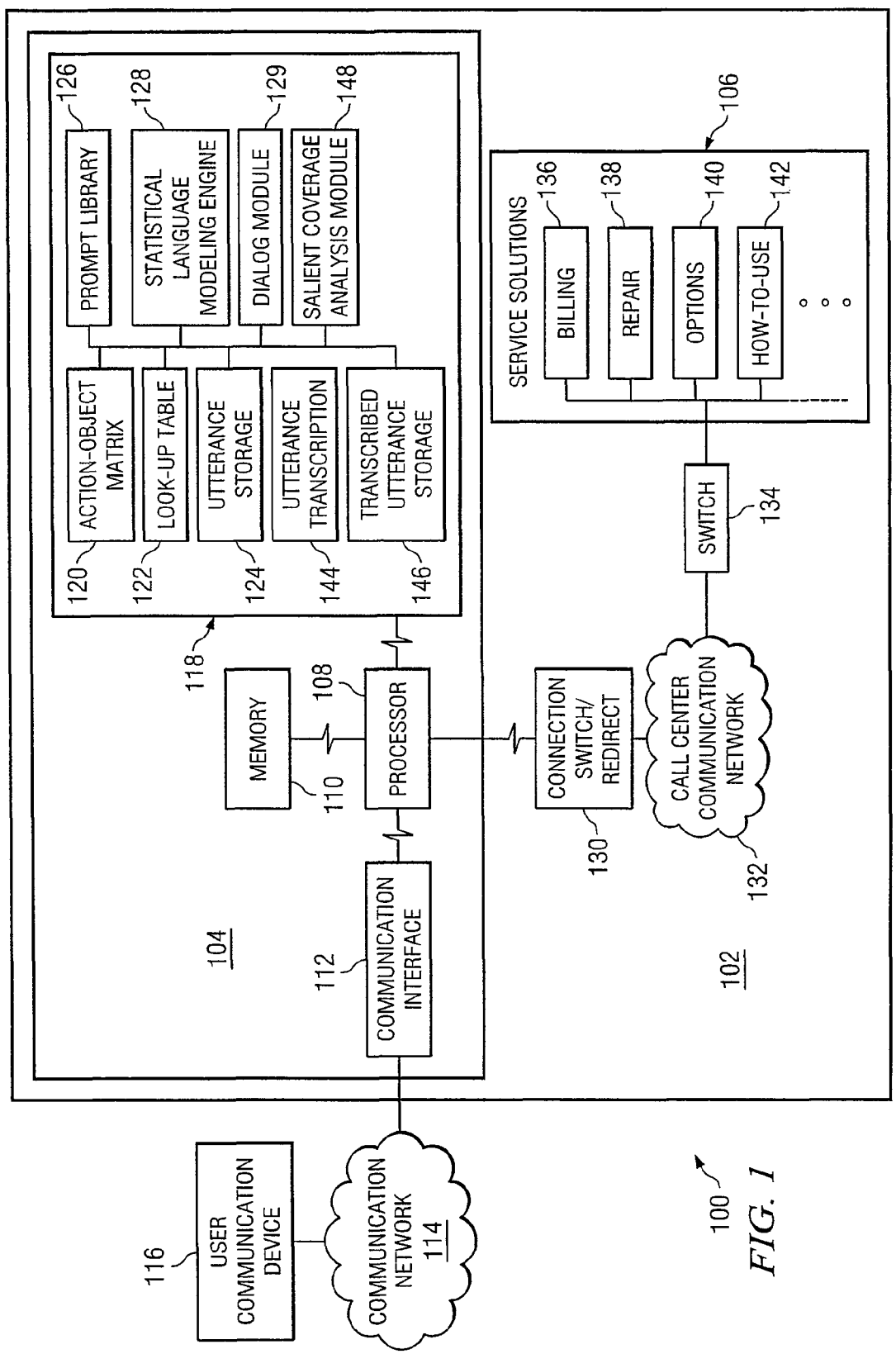
FIG. 1 is a block diagram depicting an example embodiment of a service center system according to one embodiment of the present invention.

FIG. 1 is a block diagram depicting an example embodiment of a service center system 100 according to one embodiment of the present invention. System 100 enables users to conduct transactions via a service center 102. For example, as referred to herein, service center 102 may be a customer service call center for a telephone services company. However, as described below, the present invention may be used in conjunction with any other types of call centers, as well as with any systems that use speech recognition to perform an action or otherwise facilitate an action in response to speech input of a user. As used herein, the term "transaction" or it variants refers to any action that a user desires to perform in conjunction with or have performed by service center 102.

The example service center 102 includes one or more computing apparatuses 104 that are operably coupled to one or more transaction processing service solutions 106. Included in computing apparatus 104 is a processor 108. Operably coupled to processor 108 of computing apparatus 104 is a memory 110. Computing apparatus 104 employs processor 108 and memory 110 to execute and store, respectively, one or more instructions of a program of instructions (i.e., software).

Also included in computing apparatus 104 is communication interface 112. Communication interface 112 is preferably operable to couple computing apparatus 104 and/or service center 102 to an internal and/or external communication network 114. Communication network 114 may be the public-switched telephone network (PSTN), a cable network, an internet protocol (IP) network, a wireless network, a hybrid cable/PSTN network, a hybrid IP/PSTN network, a hybrid wireless/PSTN network, the Internet, and/or any other suitable communication network or combination of communication networks.

Communication interface 112 preferably cooperates with communication network 114 and one or more user communication devices 116 to permit a user associated with each user communication device 116 to conduct transactions via service center 102. User communication device 116 may be a wireless or wireline telephone, dial-up modem, cable modem, DSL modem, phone sets, fax equipment, answering machines, set-top boxes, televisions, POS (point-of-sale) equipment, PBX (private branch exchange) systems, personal computers, laptop computers, personal digital assistants (PDAs), other nascent technologies, or any other appropriate type or combination of communication equipment available to a user. Communication device 116 may be equipped for connectivity to communication network 114 via a PSTN, DSL, cable network, wireless network, or any other appropriate communications channel.

In operation, service center 102 permits a user to request, using speech, processing or performance of one or more transactions by service solutions 106. To enable such processing, computing apparatus 104 may include or have access to one or more storage devices 118 including one or more programs of instructions operable to interpret user intent from the user's speech, identify a solution sought by the user, and route the user to an appropriate service solution 106.

To aid in the interpretation, identification and routing operations of service center 102, storage 118 includes an action-object matrix 120, a look-up table 122, utterance storage 124, a prompt library 126, one or more speech recognition modules (such as a statistical language modeling engine 128), and a dialog module 129. Furthermore, to analyze the performance of statistical language modeling engine 128 and the action-objects in action-object matrix 120, storage 118 also includes an utterance transcription module 144, transcribed utterance storage 146, and a salient coverage analysis module 148. Additional detail regarding the operation and cooperation of the various components included in storage 118 will be discussed in greater detail below.

In the illustrated embodiment, computing apparatus 104 is communicatively coupled to one or more connection switches or redirect devices 130. Connection switch or redirect device 130 enables computing apparatus 104, upon determining an appropriate destination for the processing of a user-selected transaction, to route the user via communication network 132 and, optionally, one or more switches 134, to an appropriate service agent or module of service solutions 106.

Service solutions 106 preferably include a plurality of service agents or modules operable to perform one or more operations in association with the processing of a selected user transaction. For example, if service center 102 is a telephone services call center, service solutions 106 may include one or more service agents or modules operable to perform billing service solutions 136, repair service solutions 138, options service solutions 140, how-to-use service solutions 142, as well as any other appropriate service solutions. The service agents or modules implemented in or associated with service solutions 106 may include, but are not limited to, automated or self-service data processing apparatuses, live technician support (human support), or combinations thereof.

Figure 2:
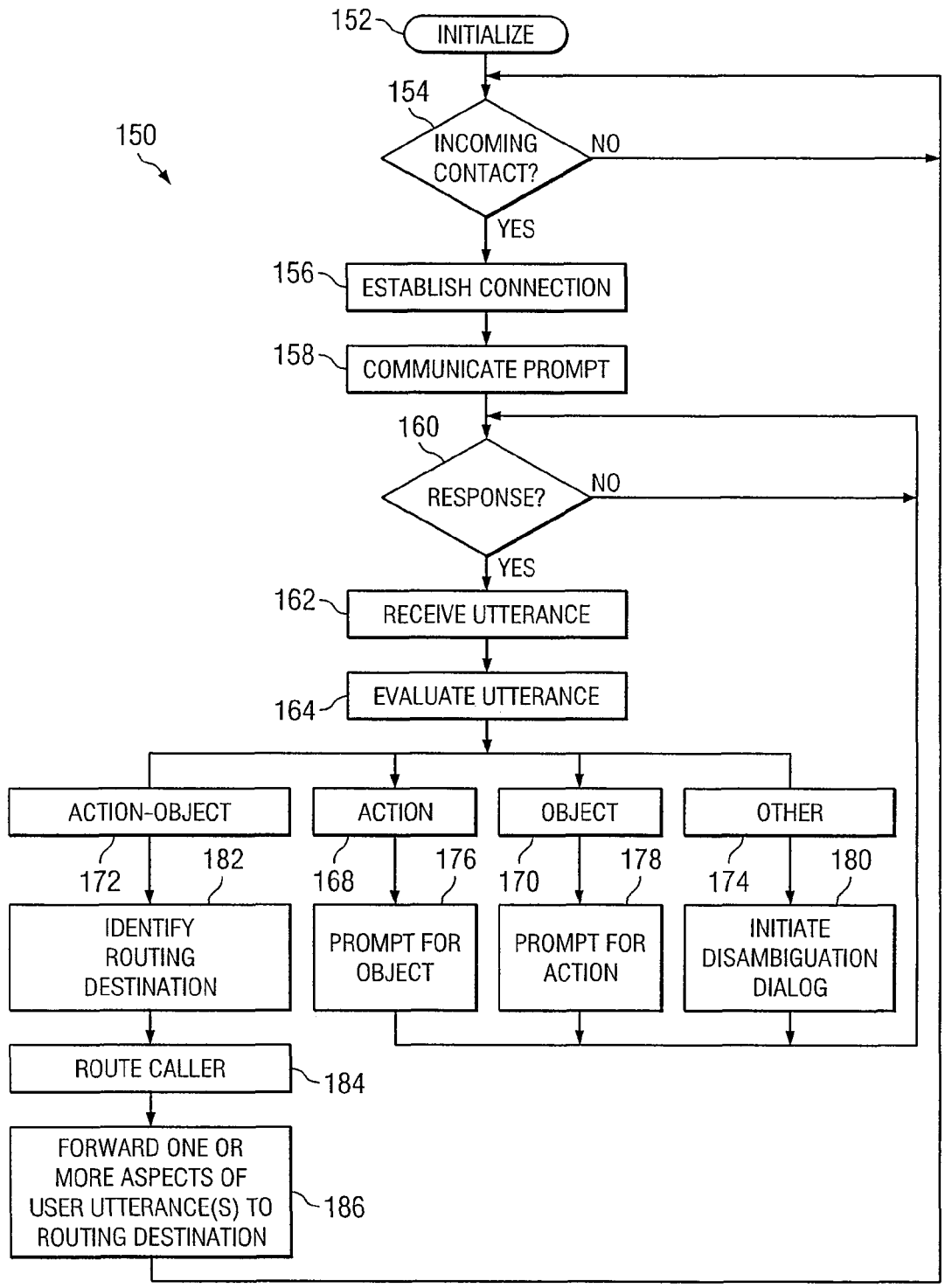
FIG. 2 is a flow diagram depicting an example automatic call routing method according to one embodiment of the present invention.

FIG. 2 illustrates an example method 150 for a speech-enabled call routing using an action-object matrix according to one embodiment of the present invention. Method 150 of FIG. 2 may be implemented in one or more computing apparatuses 104 of one or more service centers 102. As such the method will be described with reference to the operation of service center 102 of FIG. 1.

Upon initialization of service center 102 at step 152, method 150 proceeds to step 154 where service center 102 provides for and awaits an incoming communication from a user communication device 116 via communication network 114. However, a user may connect with service center 102 in any other suitable manner.

Upon detection of an incoming contact at step 154, method 150 preferably proceeds to step 156 where a communication connection with the user communication device 116 is established. As suggested above, establishing a communication connection with an incoming contact from a user at step 156 may include, but is not limited to, receiving a user phone call via a PSTN or other wireline network, a wireless network, or any of numerous other communication networks.

Once a communication connection has been established at step 156, method 150 proceeds to step 158 where one or more prompts are communicated to the user of user communication device 116. In particular embodiments, the communication of one or more prompts is aimed at eliciting a request from the user for the processing of one or more transactions or operations. For example, at step 158, computing apparatus 104 may access prompt library 126 of storage 118 to generate a user transaction selection prompt such as, "Thank you for calling our service center. Please tell me how we may help you today." Furthermore, any other suitable prompts designed to elicit a response from the user regarding a transaction that the user desires to be performed may be used.

At step 160 of method 150, service center 102 awaits a user response to the communicated prompt. Upon detection of a user response at step 160, method 150 preferably proceeds to 162 where a natural language response (a user "utterance") from the user responsive to the communicated prompt is preferably received. Receipt of an utturance from a user may include storage of the user's utterance in utterance storage 124 of computing apparatus storage 118. Permanent or temporary storage of a user utterance may enable and/or simplify the performance of speech recognition analysis thereon and may provide for analysis of the performance of service center 102, as described in greater detail below.

Following receipt of a user utterance at step 162, method 150 proceeds to step 164 where the user utterance is evaluated to interpret or identify an intent of the user and a requested transaction to be performed. In particular embodiments, evaluation of a user utterance at step 164 may include the use of one or more speech recognition technologies, such as that available from statistical language modeling engine 128 of computing apparatus 104. As suggested above, statistical language modeling engine 128 may cooperate with utterance storage 124 in the evaluation of the user utterance.

Statistical language modeling engine 128 may evaluate the user utterance received at step 162 in cooperation with action-object matrix 120, which defines a number of different action-objects (and which is described in greater detail below in conjunction with FIG. 3). In the evaluation of a user utterance at step 164, the speech recognition technology preferably employed by computing apparatus 104 seeks to identify an action, an object or an action-object combination from the user utterance. By creating a finite number of transaction options (i.e., action-objects) via action-object matrix 120, proper routing of a user to a service agent or module 136, 138, 140 or 142, may be accomplished with improved efficiency (for example, substantially eliminating user routing errors and, therefore, user re-routing).

Each action-object in action-object matrix 120 defines a particular action to be taken and an object that is the subject of the action (in other words, a transaction to be performed). For example, the action-object "pay/bill" defines an action "pay" to be carried out on an object "bill." As described below, the assignment of an action-object to a user utterance enables efficient routing of the user to enable performance of a desired transaction.

To assist in assigning a particular action-object to a user utterance, statistical language modeling engine 128 may store and associate one or more salient action terms and one or more salient object terms with each action-object. The statistical language modeling engine 128 can then search for these salient terms in a user utterance to assign the user utterance to a particular action-object. The salient terms may be the actual action and object of the action-object and/or the salient terms may be different from the action and object. For example, the action-object "pay/bill" may be associated with the salient action term "pay" and the salient object term "bill." In addition, the "pay/bill" action-object may be associated with the salient object terms "account" and "invoice." Therefore, any user utterance including the term "pay" and at least one of the terms "bill," "account" or "invoice" would preferably be associated with the "pay/bill" action-object. Multiple salient action terms could also or alternatively be associated with this action-object. At least a portion of the user utterance evaluation performed at step 164 preferably includes determining whether the user utterance includes a salient action term, a salient object term, or both a salient action term and a salient object term.

If it is determined that the user utterance contains only a salient action term(s) 168, method 150 proceeds to step 176 where one or more additional prompts may be communicated to the user by dialog module 129 or any other suitable component. The prompts presented at step 176 are preferably designed to elicit the selection of an object (via a salient object term) in a subsequent user utterance. For example, referring to the action-object matrix depicted in FIG. 3, it may have been determined from the initial user utterance that the user desires to "inquire" about something. Having identified that the user wishes to make an "inquiry" (the action), computing apparatus 104 may cooperate with dialog module 129, prompt library 126 and action-object matrix 120 to prompt the user for selection of an object associated with the "inquire" action. As illustrated in FIG. 3, examples of objects associated with the "inquire" action include, in one embodiment, optional services, basic service, billing, cancellation, repair, payment, specials, and name and number. It should be understood that the action-object matrix depicted generally in FIG. 3 is included primarily for purposes of illustration. As such, alternate embodiments of an action-object matrix may be implemented without departing from the spirit and scope of teachings of the present invention.

Similarly, if it is determined that the user utterance contains only a salient object term 170, method 150 preferably proceeds to step 178 where one or more prompts designed to elicit the selection of an action (via a salient action term) in a subsequent user utterance. For example, referring again to the action-object matrix generally depicted in FIG. 3, if it is determined from the initial user utterance that the user desires some sort of action associated with a "bill", computing apparatus 104 may cooperate with dialog module 129, action-object matrix 120 and prompt library 126 to generate one or more prompts directed to eliciting user selection of an "action" associated with the bill "object". As shown in FIG. 3, examples of actions associated with a "bill" object may include, in one embodiment, inquiry, information, fixing or repairing, and paying.

Method 150 may loop through steps 176 or 178 one or more times in an attempt to illicit an appropriate salient action term or an appropriate salient object term, respectively, for any desired number of loops. If evaluation of the user utterances does not lead to the utterance of a salient action term 168 nor a salient object term 170 after a predetermined number of loops, if neither a salient action term 168 or a salient object term 170 are identified (an "other" utterance 174), or if salient action terms 168 and/or salient object terms 170 associated with multiple action-objects are identified, then method 150 proceeds to step 180 where a disambiguation dialogue may be initiated and performed by dialog module 129. In such an event, method 150 preferably provides for additional appropriate dialogue to be performed with the user in an effort to elicit a usable "action-object" combination from the user (for example, asking the user to be more specific in his or her request).

Following prompting for an "object" at step 176, prompting for an "action" at step 178, or initiation and performance of disambiguation dialogue at 180, method 150 preferably returns to step 160 where a response may be awaited as described above. Method 150 then preferably proceeds through the operations at steps 162 and 164 until an "action-object" combination 172 has been elicited from the user in a user utterance. An escape sequence may also be included in method 150 where it has been determined that a user requires human assistance, for example.

After identification of an "action-object" combination 172 (either from the initial utterance or from the repeated prompting described above), method 150 preferably proceeds to step 182. At step 182, computing apparatus 104 preferably cooperates with action-object matrix 120 and look-up table 122 to identify a preferred or proper routing destination for processing the user-selected transaction. As suggested above, the routing destinations identified at step 182 may include routing destinations associated with the service agents or modules available in service solutions 106. As mentioned above, service agents or modules 136, 138, 140 and 142 may include automated transaction processing available via computing apparatus 104 or a similar device, live support, or combinations thereof, as well as other suitable transaction processing options.

Following identification of a preferred or proper routing destination at step 182, method 150 preferably proceeds to step 184 where the user connection is preferably routed to the appropriate destination indicated in look-up table 122. Following the routing of the user connection, method 150 preferably proceeds to step 186 where one or more aspects of the user utterance or utterances are optionally forwarded to the service agent or module destination to which the caller and/or user connection is routed. For example, in particular embodiments, method 150 provides for the identified action-object to be forwarded to the service agent associated with the selected routing destination. In yet other embodiments, no information is forwarded and the user is simply routed to the appropriate destination. Following the routing of the user connection (and any forwarding of information), method 150 preferably returns to step 154 where another user connection is awaited.

It should be understood that some of the steps illustrated in FIG. 2 may be combined, modified or deleted where appropriate, and additional steps may also be added to the method.

Additionally, as indicated above, the steps may be performed in any suitable order without departing from the scope of the present invention.

Referring again to FIG. 3, an action-object matrix 120 according to one embodiment of the present invention is shown. The example action-object matrix 120 shown in FIG. 3 includes a number of columns of actions 202 and a number of rows of objects 204. The intersection of an action column with an object row generally defines an action-object pair identifying a transaction available via service center 102 (for example, using one or more service modules or agents 136, 138, 140 and 142).

As described above, action-object matrix 120 is used in association with other components of service center 102 to interpret user intent and identify a desired transaction from a user utterance. For example, using actions 202 and objects 204 of action-object matrix 120, in conjunction with the method 150 described above, a user utterance such as "How much do I owe on my bill?" may be evaluated to relate to the action-object "inquire/bill" 206. In a further example, the user utterance, "I have a problem with a charge on my bill" may be associated with the action-object "fix-repair/bill" 208. In still another example, the user utterance, "Where can I go to pay my phone bill?" may be associated with the action-object "where/payment" 210. In yet another example, the user utterance, "How do I set up Call Forwarding?" may be associated with the action-object "how-to-use/option" services 212. In a further example, the user utterance, "I'd like to get CallNotes" may be associated with the action-object "acquire/optional services" 214.

As mentioned above, service center 102 uses one or more salient action terms and one or more salient object terms associated with each action-object to associate a user utterance with the action-object. The salient terms may be stored in association with action-object matrix 120 or elsewhere in service center 102 (or at a location remote to service center 102). If stored in association with action-object matrix 120, the salient terms may be linked to particular action-objects, to particular actions (for salient action terms), or to particular objects (for salient object terms).

After an action-object has been identified through the user of action-object matrix 120 and other components of service center 102, look-up table 122 is used to identify the routing destination associated with an identified action-object. For example, upon identifying action-object "inquire/bill" 206 from a user utterance, computing apparatus 104 may utilize action-object matrix 120 and look-up table 122 to determine that the appropriate routing destination for the "inquire/bill" action-object 206 is "Bill" service agent or module 136. In another example, upon identifying action-object "fix-repair/bill" 208 from a user utterance, computing apparatus 104 cooperating with action-object matrix storage 120 and look-up table 122 may determine that an appropriate routing destination for the user connection includes "Repair" service agent or module 138. Additional implementations of associating a look-up table with an action-object matrix may be utilized without departing from the spirit and scope of teachings of the present invention.

FIG. 4 illustrates a graph 300 showing an example relationship between a match rate for matching user utterances with salient terms and a performance rate for correctly directing a user to the appropriate destination of a service center. As described above, user utterances may be associated with a particular action-object by matching particular words in the user utterance with one or more salient action terms and one or more salient objects terms. The way in which salient terms are associated with particular action-objects will often have a significant effect on the performance of a service center. For example, the more salient terms that are associated with an action-object, the more chance that a user desiring to perform a transaction associated with that action-object will speak at least one of the associated salient action terms and at least one the associated salient objects terms (referred to herein as the "match rate").

However, the more salient terms that are associated with a particular action-object, the more potential for overlap of salient terms associated with different action-objects. Such overlap can cause user utterances to be associated with the wrong action-object and thus cause the user to be directed to the wrong destination. In other words, the "performance rate" is lowered. On the other hand, if a small number of salient terms are associated with an action-object (for example, one salient action term and one salient object term), the match rate may be low, but the performance rate when there is a salient term match will be high.

Graph 300 illustrated in FIG. 4 illustrates this relationship between the salient term match rate 302 and the performance rate 304. As described above, the match rate 302 increases (as measured by the percentage 306 of matches of words in user utterances with salient terms of an action-object) as the number of salient terms 308 per action-object increases. Conversely, the performance rate 304 decreases (as measured by the percentage 306 of user connections that are assigned to the correct action-object) as the number of salient terms 308 per action-object increases. The intersection point 310 of the match rate curve 302 and the performance rate curve 304 may be a point of optimal performance of the service center in many cases. Therefore, it may be desirable to determine the percentage 312 at which the intersection point occurs and adjust the assignment of salient words to an action-object using this percentage 312 as a goal. As described below, embodiments of the present invention may be used to adjust the assignment of salient words to action-objects in this manner.

In addition to the number of salient terms that are associated with an action-object, the "quality" of the particular terms used also obviously affects the match rate and the performance rate. For example, a "pay/account" action-object may be created in a call center and may be initially associated with the salient action term "pay" and the salient object term "account." However, if most users refer to a "bill" instead of an "account," then the associated salient object term should be changed. As described in the following method, embodiments of the present invention may be used to tune the performance of a service center by adjusting the number and/or quality of salient terms associated with the action-objects used by the service center.

FIG. 5 illustrates a flow diagram depicting an example method 400 for analysis and adjustment of a speech-enabled system according to one embodiment of the present invention. Some or all of method 400 may be implemented in one or more computing apparatuses 104 of one or more service centers 102, may be implemented manually, or may be implemented through any combination of the two. Upon initialization at step 402, method 400 proceeds to step 404 where a selected number of samples of actual user utterances are collected. For example, a selected number of utterances (for example, all utterances received in response to the initial prompt from service center 102 during a particular week of operation of service center 102 or the last one thousand utterances received by service center 102) may be retrieved from utterance storage 124 of service center 102. At step 406, the selected utterances may be transcribed into text for analysis. This transcription may be performed manually, automatically, or using a combination of both. For example, utterance transcription module 144 (which may comprise a speech-to-text engine) of service center 102 may be used. The transcribed utterances may be stored in transcribed utterance storage 146 of service center 102 or in any other suitable location.

At step 408, a particular action-object (for example, from action-object matrix 120) is associated with each transcribed utterance. For example, a person can manually view the transcribed utterances and associate an appropriate action-object with each utterance. Alternatively, service center 102 can store a record of the action-object that was ultimately associated with the utterance when the user connected with service center 102 (for example, either directly after the utterance was made or after further dialog with the user making the utterance using dialog module 129). At step 410, a table may then be generated that includes each transcribed utterance and the associated action-object, and the table can be sorted by action-object. This table may be stored in transcribed utterance storage 146 or in any other suitable location.

Method 400 continues at step 412 where a particular action-object, and the utterances associated with the action-object, are selected to be analyzed. At step 414, the number of these selected utterances that contain at least one salient action term associated with the selected action-object is determined. For example, salient coverage analysis module 148 of service center 102 may access the salient action term(s) that are associated with the selected action-object and stored in service center 102 and may search (for example, a text search of transcribed utterances) for the salient action term(s) associated with the action-object being analyzed. For each utterance that is found to include a salient action term, a salient action term counter in salient coverage analysis module 148 or elsewhere is incremented by one. Similarly at step 416, the number of the utterances associated with the selected action-object that contain at least one salient object term associated with the selected action-object is determined. This step may be performed using the same technique used to determine the number of utterances that contain at least one salient action term. As with that technique, a separate counter may be incremented for each utterance containing a salient object term.

After analyzing all the utterances associated with the selected action-object, at step 418 salient coverage analysis module 148 (or any other suitable component or person) determines a match rate for the action and for the object of the selected action-object. The match rate for the action is determined by dividing the number of utterances containing a salient action term (i.e., the value of the counter) by the total number of utterances associated with the selected action-object. Similarly, the match rate for the object is determined by dividing the number of utterances containing a salient object term (i.e., the value of the counter) by the total number of utterances associated with the selected action-object. The match rate for the action and for the object each may be expressed as a percentage. For example, if seventy utterances out of a total of one hundred utterances associated with the selected action-object include a salient action term, the action match rate will be .70 or 70%.

At step 420, the action match rate and the object match rate are each compared to a match rate threshold (the same or a different threshold may be used for each). The threshold may vary depending on the particular application for which the action-objects are being implemented. In particular embodiments, the match rate threshold is the percentage 312 at which the match rate curve 302 and performance rate curve 304 for the particular application cross (as illustrated in FIG. 4). This percentage may only be able to be estimated and not precisely calculated in many cases. Any other appropriate percentage may alternatively be used for the match rate threshold.

In particular embodiments, a small number of salient terms (for example, one salient action term and one salient object term) may be initially assigned to an action-object at the beginning of method 400. At step 420, it can then be determined whether this minimum number of salient terms causes the match rate for that action-object to exceed the selected match rate threshold. If both the action match rate and the object match rate exceed the threshold, then method 400 proceeds to step 422 where it is determined whether additional action-objects remain to be analyzed. If some remain, the method returns to step 412. If none remain, method 400 ends. Method 400 may be repeated as often as desired to analyze and/or adjust the salient terms associated with the various action-objects used in a service center.

Although in some cases the use of a small number of initially assigned salient terms may cause the match rate threshold to be exceeded and thus require no adjustment of the salient terms assigned to the action-object, in other cases more salient terms will need to be added (or the existing salient terms will need to be replaced) to exceed the threshold. If it is determined at step 420 that the action match rate and/or the object match rate do not exceed the associated threshold, then method 400 proceeds to step 424 where a count is made of the different words used in the utterances associated with the action-object being analyzed. This count may be performed manually or automatically (for example, by salient coverage analysis module 148). In particular embodiments, certain words or types of words may be ignored in such a count (for example, prepositions, conjunctions, articles, pronouns, etc.).

This word count may then be used at step 426 to determine how to adjust the salient action terms and/or the salient object terms associated with the action-object being analyzed. This adjustment may include adding one or more salient terms and/or removing one or more salient terms. The determination of which salient terms to adjust may be performed manually after reviewing the word counts, although in some embodiments the determination may be performed automatically using appropriate computer software or firmware embodied in a computer-readable medium (such as software included as part of salient coverage analysis module 148). For example, software may be used that analyzes the occurrence of words in the user utterances and that suggests or implements new salient terms to associate with the action-object based on a high number of occurrences of the terms. Furthermore, the software could also suggest the disassociation of particular salient terms based on a low number of occurrences.

As an example of step 426, suppose that an example word count of one hundred utterances associated with a "pay/account" action-object indicates that the most frequently used action terms are "pay" (75 occurrences) and "settle" (10 occurrences) (with all other object terms having a lower number of occurrences). Furthermore, in the same example, suppose that the word count indicates that the most frequently used object terms are "bill" (55 occurrences), "invoice" (25 occurrences), and "account" (10 occurrences) (with all other action terms having a lower number of occurrences). If the initial salient action term was "pay," then the word count results indicate that this is the best (most often used) salient action term. This example will also assume that this 75% match rate (75 occurrences out of 100 utterances) for the salient action term "pay" meets an example 70% action match rate threshold at step 420. Therefore, no adjustment is needed for the salient action term. However, if the action match rate threshold were even higher, then "settle" could be added as a salient action term.

Furthermore, this example will assume that the initial salient object term for the "pay/account" action-object was "account" and that the object match rate threshold was also 70%. In this case, the object match rate would be 10% and thus not meet the object match rate threshold. Therefore, at step 426, a determination is made to adjust the salient object term for this action-object. In particular embodiments, the salient object term(s) for the action-object are adjusted so that the object match rate threshold is exceeded using the minimum number of salient object terms. In this example, a determination would be made that using the salient object terms "bill" and "invoice" (and not the term "account") will cause the threshold to be exceeded.

Therefore, at step 428, the salient object terms for the example "pay/account" action-object would be adjusted by adding the salient object terms "bill" and "invoice" and by removing the salient object term "account" (since the 10% that this term adds to the match rate is unnecessary to exceed the threshold. In other examples, the initially assigned salient terms may be kept while new salient terms are added. Furthermore, in some cases both the salient object terms and the salient action terms will need to be adjusted. After any appropriate adjustments are complete, method 400 proceeds to step 422, as described above.

It should be understood that some of the steps illustrated in FIG. 5 may be combined, modified or deleted where appropriate, and additional steps may also be added to the method. Additionally, as indicated above, the steps may be performed in any suitable order without departing from the scope of the present invention. Method 400 may be repeated as often as desired during the operation of a service center or other speech-enabled application to which the method might apply. For example, a particular sample of utterances might not be representative of typical user utterances and thus repeating method 400 periodically may be beneficial. Alternatively, user utterances may change over time as users become experienced with a service center or other application (and/or as the prompts used in the system change), and thus periodic updating of salient terms would be beneficial.

Although the present invention has been described in detail with reference to particular embodiments, it should be understood that various other changes, substitutions, and alterations may be made hereto without departing from the spirit and scope of the present invention. For example, although the present invention has been described with reference to a number of components included within service center 102, other and different components may be utilized to accommodate particular needs. The present invention contemplates great flexibility in the arrangement of these elements as well as their internal components. Moreover, speech-enabled applications or systems other than service centers may also be used in conjunction with embodiments of the present invention.

Furthermore, numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A computer implemented method for adjusting a call center application operable to associate user utterances with action-objects based on existing sets of salient terms, the method for adjusting comprising:
   automatically adding, by the computer, a new salient term to an existing set of salient terms associated with an action-object when a percentage of user utterances failing to associate with the action-object, based upon the existing set of salient terms, exceeds a specified threshold; and
   automatically removing, by the computer, a current association of a salient term with the action-object from the existing set of salient terms when a percentage of user utterances associating with the action-object, based upon the existing set of salient terms, exceeds a specified threshold,
   wherein a size of the existing set of salient terms is maintained near an optimum value with regard to a match rate and a performance rate of the call center application.

2. The method of claim 1, wherein adding the new salient term includes selecting the new salient term based on a count indicative of terms used in a selected set of user utterances.

3. The method of claim 2, wherein adding the new salient term further includes removing an existing salient term.

4. The method of claim 3, wherein removing the current association of the salient term is based on the count.

5. The method of claim 1, wherein removing the current association of the salient term includes selecting the salient term based on a count indicative of terms used in a selected set of user utterances.

6. The method of claim 5, wherein removing the current association of the salient term further includes adding a new salient term.

7. The method of claim 6, wherein adding the new salient term is based on the count.

8. A non-transitory computer readable memory medium, including computer executable instructions for adjusting a call center application operable to associate a user utterance with an action-object based on a salient term in the user utterance, the instructions including instructions executable to:
   determine that at least one of a match rate for associating user utterances with the action-object and a performance rate for the associating user utterances with the action-object is below a corresponding threshold; and
   responsive to executing the instructions to determine, modify salient terms associated with the action-object;
   wherein the instructions executable to modify comprise instructions executable to remove an association of the salient term with the action-object based on a frequency with which the salient term occurs in a selected set of user utterances, and
   wherein a size of a set of salient terms matching the action-object is maintained near an optimum value with regard to the match rate and the performance rate.

9. The memory medium of claim 8, wherein the instructions executable to modify include instructions executable to add a new salient term associated with the action-object.

10. The memory medium of claim 9, wherein the instructions executable to add comprise instructions executable to select the new salient term based on a word count indicative of a frequency with which terms occur in a selected set of user utterances.

11. The memory medium of claim 8, wherein the instructions executable to remove comprise instructions executable to remove the association of the salient term based on a word count indicative of the frequency.

12. The memory medium of claim 11, wherein a word count corresponding to the new salient term is greater than a word count corresponding to the salient term.

13. A service center system comprising a computing apparatus, including a processor having access to a computer readable storage medium storing processor executable instructions, the computing apparatus being enabled to execute the instructions to:

associate a user utterance with an action-object based on a salient term in the user utterance; and adjust at least one of a set of salient action terms and salient object terms associated with the action-object when a specified percentage of user utterances including the salient term associate with the action-object, and wherein the instructions to adjust include instructions to remove an association of the salient term with the action-object, wherein a size of a set of salient terms associated with the action-object is maintained near an optimum value with regard to a match rate and a performance rate of the service center system.

14. The service center system of claim 13, wherein the instructions to adjust include instructions to add a new salient term associated with the action-object, wherein the new salient term includes at least one of a new salient action term and a new salient object term.

15. The service center system of claim 14, wherein the instructions to add include instructions to select the new salient term based on a word count indicative of a frequency with which terms occur in a selected set of user utterances.

16. The service center system of claim 15, wherein the instructions to remove include instructions to remove the association of the salient term based on the word count.

17. The service center system of claim 16, wherein a word count corresponding to the new salient term is greater than a word count corresponding to the salient term.

* * * * *